United States Patent Office 2,879,321
Patented Mar. 24, 1959

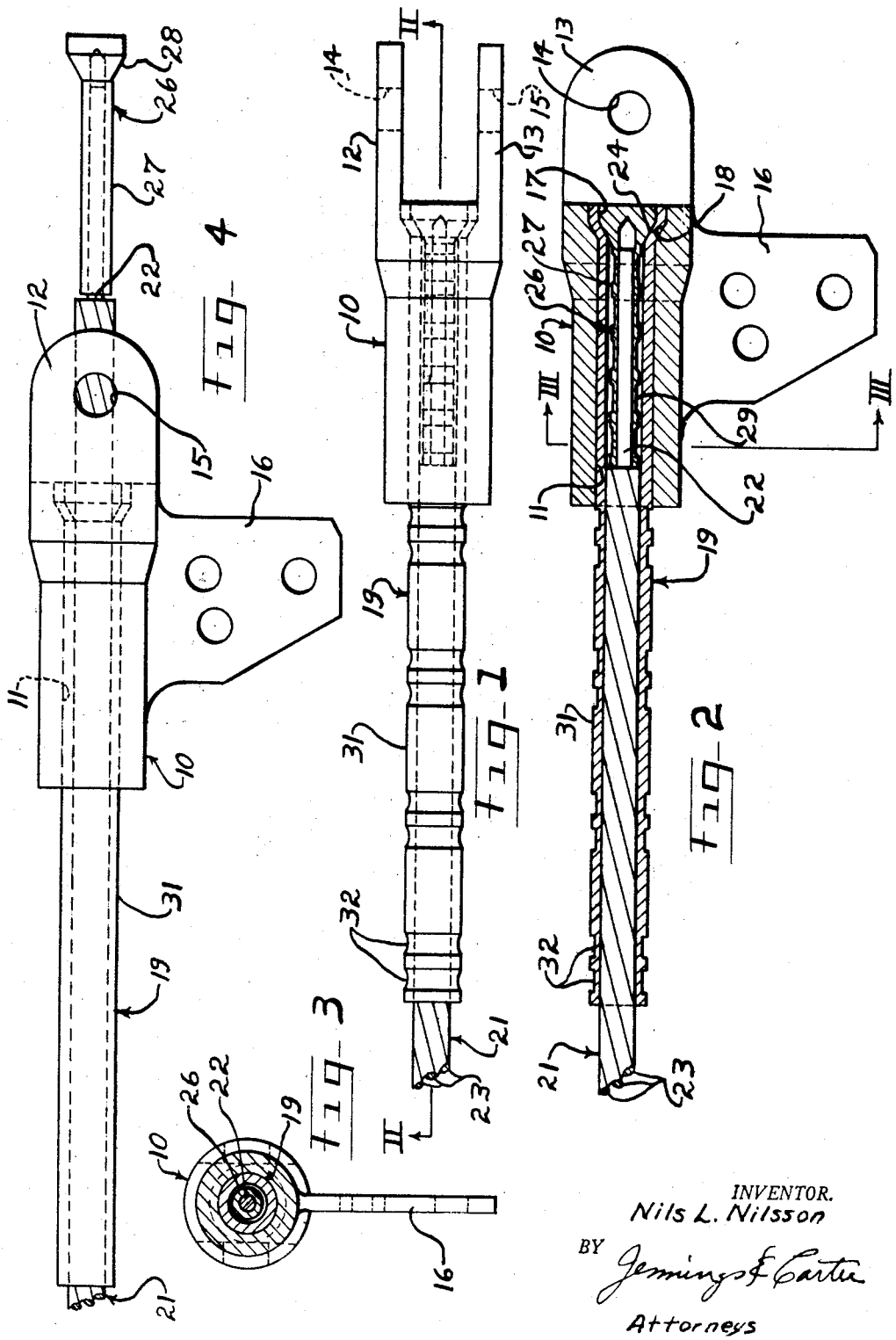

2,879,321

DEAD END CONNECTOR

Nils L. Nilsson, Birmingham, Ala., assignor to Anderson Electric Corporation, a corporation of Alabama Application June 4, 1956, Serial No. 589,294

3 Claims. (Cl. 174—79)

This invention relates to a dead end connector and more particularly to such a connector which shall be adapted for use with stranded electrical cables having high tensile strength core elements or strands surrounded by strands of electrically conductive wire.

A prime object of my invention is to provide a dead end connector for stranded cables in which the pull of the cable is effective to create high unit pressure contact areas between the elements of the connector.

Another object of my invention is to provide a dead end connector for a stranded cable having a high tensile strength core element surrounded by strands of electrically conductive wire with the end of the core element exposed whereby the core element supports the major portion of the weight of the cable, thus providing the necessary strength for the composite cable.

A further object of my invention is to provide a dead end connector of the character designated which shall be simple of construction, economical of manufacture and which shall be adapted for installation in a minimum of time.

Briefly, my improved dead end connector comprises an outer sleeve member having means associated therewith for connecting the same to a supporting structure and having an enlarged inner diameter portion adjacent one end thereof joined to the main bore of the sleeve by a tapered portion. An inner sleeve is positioned within the outer sleeve and projects outwardly of the outer sleeve at the end thereof opposite the enlarged diameter portion for receiving an end of the stranded cable. The inner sleeve is expanded into intimate contact with the bore of the outer sleeve, including the enlarged diameter portion thereof, whereby a tapered portion is provided on the inner sleeve which corresponds generally to the tapered portion on the outer sleeve. A tubular anchor member is positioned within the inner sleeve and is secured to the exposed end of the core element. An enlarged tapered portion corresponding generally to the tapered portion of the inner sleeve is provided on the anchor member in position to engage the tapered portion of the inner sleeve whereby inward movement of the anchor member relative to the inner sleeve is limited and a high unit contact area is provided between the tapered portions of the inner and outer sleeves.

A connector embodying features of my invention is illustrated in the accompanying drawing, forming a part of this application, in which:

Fig. 1 is a plan view, partly broken away and in section showing the stranded cable secured in place within the connector;

Fig. 2 is a sectional view taken generally along line II—II of Fig. 1;

Fig. 3 is a sectional view taken generally along line III—III of Fig. 2; and,

Fig. 4 is a side elevational view, partly broken away and in section, showing the cable inserted through the connector and with the anchor member secured to the exposed end of the core element prior to sliding the cable in the connector to position the anchor member in the inner sleeve member.

Referring now to the drawing for a better understanding of my invention, I show an outer sleeve member 10 having a bore 11 therethrough. Clevis arms 12 and 13 are attached to or formed integrally with the sleeve 10 for attaching the sleeve 10 to a supporting structure. Suitable openings 14 and 15 are provided in the clevis arms 12 and 13, respectively, for receiving a pin or the like. Also, mounted on or formed integrally with the sleeve 10 is a bracket 16 for attaching electrical cables in a manner well understood. The bore 11 of the outer sleeve 10 is provided with an enlarged diameter relatively short portion 17 which is joined to the major or longest portion of the bore 11 by means of a tapered portion 18, forming an annular tapered seat within the sleeve 10 as shown.

Positioned within the outer sleeve 10 is an inner sleeve 19 which projects outwardly of the outer sleeve at the end thereof opposite the enlarged portion 17 for receiving the end of a stranded cable indicated generally at 21. The cable 21 comprises a high tensile strength core strand 22 which is surrounded by strands 23 of electrically conductive wire. Strands 23 are cut away adjacent the end of the cable 21 to expose the end of the core strand, as shown in Fig. 2. The reason for this construction is that most wires which are good conductors of electricity, such as aluminum and the like, have inferior strength characteristics. Accordingly, a core strand formed of a high tensile strength material, such as steel, is employed to provide the necessary strength to the composite cable.

As shown in Fig. 2, the inner sleeve 19 is expanded, by any suitable means such as by rolling or the like, whereby it is forced into intimate contact with the bore of the outer sleeve 10. The portions of the inner sleeve 19 adjacent the enlarged portion 17 and the tapered portion 18 are thus expanded whereby their outer surfaces correspond generally to the inner surfaces of the enlarged portion 17 and the tapered portion 18. The inner sleeve 19 is thus provided with a tapered portion 24 which corresponds generally to the tapered portion 18 of the outer sleeve 10.

The exposed end of the core element 22 is received within an elongated anchor member 26 having an elongated shank 27 and an enlarged tapered portion 28 which corresponds generally to the inner surface of the tapered portion 24 of the inner sleeve 19. The exposed end of the core element 22 is secured to the anchor member 26 as by crimping at 29.

With the anchor member 26 thus secured to the exposed end of the core element 22, the stranded cable 21 is pulled in a direction (to the left as viewed in Fig. 4) to draw the anchor member into the inner sleeve member 19 with the tapered surface 28 of the anchor member in contact with the inner surface of the tapered portion 24 of the inner sleeve.

As shown in Figs. 1 and 2, the inner sleeve 19 extends outwardly of the outer sleeve as at 31 at the end thereof opposite the enlarged portion 17 and receives the stranded cable 21 as shown. The outwardly projecting portion 31 of the inner sleeve 19 is secured about the stranded cable 21 as by crimping at 32, thereby preventing relative movement between the inner sleeve 19 and the strands 23 of the cable.

From the foregoing description, the construction and assembly of my improved dead end connector will be readily understood. The bore 11 of the outer sleeve 10 is enlarged adjacent the clevis end thereof to form the enlarged or outwardly flaring tapered portion 18, as shown.

The inner sleeve 19 is inserted in the outer sleeve 10 and is enlarged by any suitable means, such as by rolling or the like, whereby the portion of the inner sleeve 19 positioned within the outer sleeve 10 is forced into intimate contact with the outer sleeve. A tapered portion 24 is thus formed on the inner sleeve which corresponds generally to and is in intimate contact with the tapered portion 18 of the outer sleeve.

With the inner sleeve 19 thus secured to the outer sleeve 10, the stranded cable 21 is inserted into the projecting end 31 of the inner sleeve whereby the exposed end of the core element 22 extends outwardly of the clevis arms 12 and 13, as shown in Fig. 4. The anchor member 26 is placed over the exposed end of the core element 22 and is secured thereto as by the crimping 29. See Fig. 2. After securing the exposed end of the core element 22 to the anchor member 26, cable 21 is pulled through the connector to position the anchor member 26 within the confines of the inner sleeve member with the tapered portion 24 thereof in contact with the tapered portion 18. The projecting portion 31 of the inner sleeve 19 is then secured to the stranded cable 21 by crimping at 32. The connector is then mounted on a suitable supporting structure in a manner well understood, such as by passing a pin through the openings 14 and 15 in the clevis arms 12 and 13. An electrical conductor may then be secured to the bracket 16 in a manner well understood.

From the foregoing it will be seen that I have devised an improved dead end connector which greatly simplifies the erection of power lines and one which does not impede the flow of current therethrough. By providing an inner sleeve expanded or otherwise forced into intimate contact with an outer sleeve and tapered portions on the inner and outer sleeves in engagement with each other, together with an anchor member having a tapered portion corresponding generally to the tapered portion of the inner sleeve, the pull exerted on the connector by the cable causes the inner sleeve to be forced still tighter against the tapered portion of the outer sleeve, thereby providing a high unit pressure contact area between the inner and outer sleeves. An excellent current path thus is provided between the inner sleeve 19 through the high unit pressure contact area between the tapered portions of the inner and outer sleeves to the outer sleeve 10.

I preferably make the outer sleeve 10 of material which is harder than the sleeve 19. The softer metal of the sleeve 19 is more readily forced into extremely intimate, good conducting contact with the outer sleeve than if both sleeves were of material of equal hardness.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a dead end connector for a stranded cable having a high tensile strength core strand surrounded by strands of electrically conductive wire with the end of said core strand exposed, an outer sleeve having an enlarged inner diameter portion adjacent one end thereof, means for connecting said outer sleeve to a supporting structure, an inner sleeve having one end within said outer sleeve and the other end projecting outwardly of the outer sleeve at the end thereof opposite said enlarged diameter portion for receiving an end of the stranded cable, said inner sleeve being expanded into intimate contact with said outer sleeve, a tubular anchor member within said inner sleeve and disposed to receive the exposed end of the core strand, the outwardly projecting portion of the inner sleeve and the tubular anchor member being crimped onto the stranded cable and the exposed end of the core strand respectively, and an enlarged diameter portion on said tubular anchor member disposed to bear against the inner surface of the portion of the inner sleeve which has its outer surface in contact with said enlarged inner diameter portion of the outer sleeve.

2. In a dead end connector for a stranded cable having a high tensile strength core strand surrounded by strands of electrically conductive wire with the end of said core strand exposed, an outer sleeve having an enlarged inner diameter portion adjacent one end thereof joined to the main bore of the sleeve by a tapered portion, means for connecting said outer sleeve to a supporting structure, an inner sleeve within said outer sleeve and projecting outwardly of the outer sleeve at the end thereof opposite said enlarged diameter portion for receiving an end of the stranded cable, said inner sleeve being expanded into intimate contact with said outer sleeve, a tubular anchor within said inner sleeve having a shank portion smaller in diameter than the internal diameter of said inner sleeve and disposed to receive the exposed end of the core strand, the outwardly projecting portion of the inner sleeve and the tubular anchor being crimped onto the stranded cable and the exposed end of the core strand respectively, and an enlarged tapered portion on said tubular anchor disposed to bear against the inner surface of the portion of the inner sleeve which has its outer surface in contact with said tapered portion of the outer sleeve whereby inward movement of said anchor relative to the inner sleeve is limited and the portion of said inner sleeve adjacent the tapered portion of the outer sleeve is urged toward said tapered portion of the outer sleeve.

3. In a dead end connector for a stranded cable having a high tensile strength core strand surrounded by strands of electrically conductive wire with the end of said core strand exposed, an outer sleeve having an enlarged inner diameter portion adjacent one end thereof joined to the main bore of the sleeve by a tapered portion, means for connecting said outer sleeve to a supporting structure, an inner sleeve within said outer sleeve and projecting outwardly of the outer sleeve at the end thereof opposite said enlarged diameter portion for receiving an end of the stranded cable, said inner sleeve being of a softer metal than said outer sleeve and being expanded into intimate contact with the main bore and the enlarged diameter portion of the outer sleeve whereby the inner sleeve is provided with a tapered portion corresponding generally to the tapered portion of the outer sleeve, a tubular anchor member within said inner sleeve having a shank portion smaller in diameter than the internal diameter of said inner sleeve and disposed to receive the exposed end of the core strand, the outwardly projecting portion of the inner sleeve and the shank portion of said anchor member being crimped onto the stranded cable and the exposed end of the core strand respectively, and an enlarged tapered portion adjacent one end of said anchor member corresponding generally to the tapered portion of the inner sleeve whereby a high unit pressure contact area is provided between the tapered portions of the inner and outer sleeves.

References Cited in the file of this patent

UNITED STATES PATENTS

| | | |
|---|---|---|
| 1,746,879 | Varney | Feb. 11, 1930 |
| 2,668,280 | Dupre | Feb. 2, 1954 |